United States Patent [19]
Szeliski et al.

[11] Patent Number: 5,917,937
[45] Date of Patent: Jun. 29, 1999

[54] METHOD FOR PERFORMING STEREO MATCHING TO RECOVER DEPTHS, COLORS AND OPACITIES OF SURFACE ELEMENTS

[75] Inventors: Richard Stephen Szeliski, Bellevue, Wash.; Polina Golland, Somerville, Mass.

[73] Assignee: Microsoft Corporation, Redmond, Wash.

[21] Appl. No.: 08/843,326

[22] Filed: Apr. 15, 1997

[51] Int. Cl.⁶ .................................................... G06K 9/00
[52] U.S. Cl. ........................................... 382/154; 382/106
[58] Field of Search .................................... 382/154, 162; 345/419–424, 139, 427; 348/42, 43

[56] References Cited

U.S. PATENT DOCUMENTS

| | | | |
|---|---|---|---|
| 4,745,562 | 5/1988 | Prazdny | 901/47 |
| 5,016,173 | 5/1991 | Kenet et al. | 382/128 |
| 5,179,441 | 1/1993 | Anderson et al. | 348/43 |
| 5,309,356 | 5/1994 | Nishide et al. | 382/131 |
| 5,381,518 | 1/1995 | Drebin et al. | 345/424 |
| 5,555,352 | 9/1996 | Lucas | 395/123 |
| 5,582,173 | 12/1996 | Li | 128/916 |
| 5,719,954 | 2/1998 | Onda | 382/154 |

FOREIGN PATENT DOCUMENTS 7-332970  12/1995  Japan .

OTHER PUBLICATIONS

Scharstein "Stereo vision for view synthesis" Proc. of IEEE Conference on Computer Vision and Pattern Recognition pp. 852–858, Jun. 1996.

Ichimura "volume data coding based on region segmentatin using finite mixture model" Proc. of 3rd IEEE International Conference on Image Processing vol. 3 pp. 363–366, Sep. 1996.

Gelder et al. "Direct volume rendering with shading via three-dimensional textures" Proc. 1996 Symposium on volume visualization pp. 23–30, Oct. 1996.

He et al. "fast stereo volume rendering " Proc. of Visualization 96 pp. 49–56, Oct. 1996.

"Compositing, Part 1: Theory," by James F. Blinn, *IEEE Computer Graphics and Applications*, Sep. 1994, pp. 83–87.

"Compos[i]ting, Part 2: Practice," by James F. Blinn, *IEEE Computer Graphics and Applications*, Nov. 1994, pp. 78–82.

(List continued on next page.)

*Primary Examiner*—Jon Chang
*Assistant Examiner*—Jingge Wu
*Attorney, Agent, or Firm*—Klarquist Sparkman Campbell Leigh & Whinston LLP

[57] ABSTRACT

A stereo matching method simultaneously recovers disparities, colors and opacities from input images to reconstruct 3-dimensional surfaces depicted in the input images. The method includes formulating a general disparity space by selecting a projective sampling of a 3D working volume, and then mapping the input images into cells in the general disparity space. After computing statistics on the color samples at each cell, the method computes initial estimates of color and opacity from the statistics (e.g., the mean and variance of the color samples). The method uses opacity to compute visibility and then uses this visibility information to make more accurate estimates by giving samples not visible from a given camera less or no weight. The method uses the initial estimates as input to refining process which tries to match re-projected image layers to the input images.

29 Claims, 7 Drawing Sheets

OTHER PUBLICATIONS

"A Space–Sweep Approach to True Multi–Image Matching," by Robert T. Collins, Department of Computer Science University of Massachusetts, 1996 IEEE, pp. 358–363.

"Structure from Stereo—A Review," by Umesh R. Dhond and J. K. Aggarwal, *IEEE Transactions on Systems, Man, and Cybernetics*, vol. 19, No. 6, Nov./Dec. 1989, pp. 1489–1510.

"A Multiple–Baseline Stereo," by Masatoshi Okutomi and Takeo Kanade, *IEEE Transactions on Pattern Analysis and Machine Intelligence*, vol. 15, No. 4, Apr. 1993, pp. 353–363.

"Stereo Matching with Non–Linear Diffusion," 1996 IEEE Computer Society Conference on Computer Vision and Pattern Recognition, by Daniel Scharstein and Richard Szeliski, Jun. 18–20, 1996, pp. 343–350.

"Blue Screen Matting," by Alvy Ray Smith and James F. Blinn, Computer Graphics Proceedings, Annual Conference Series, 1996, pp. 259–268.

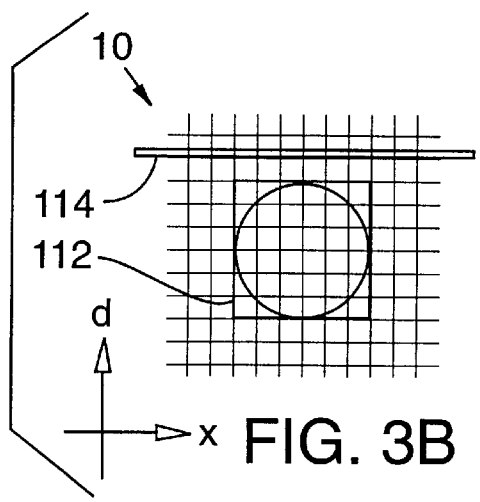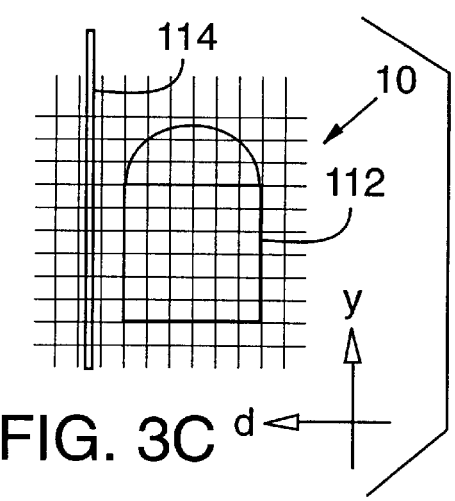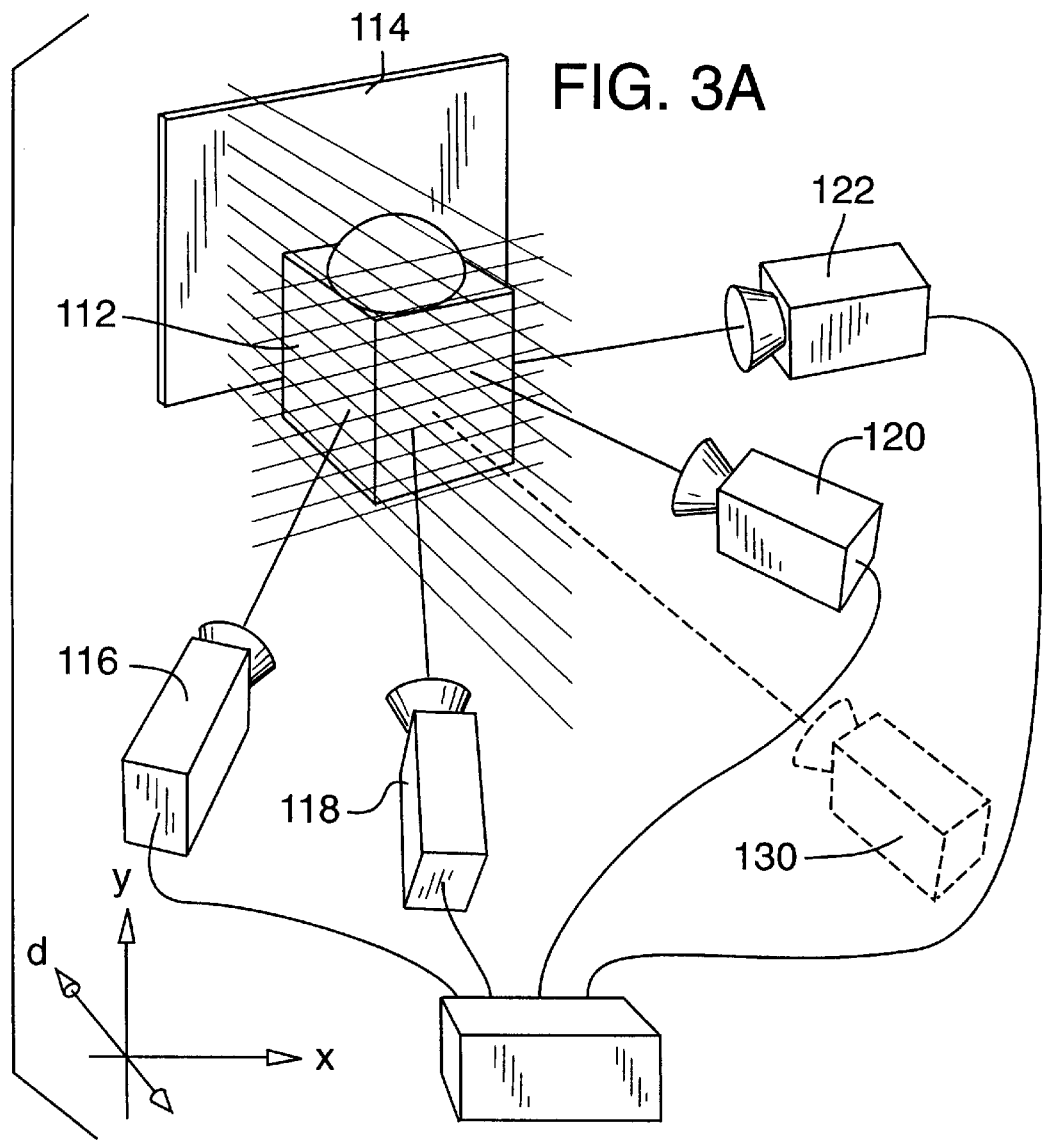

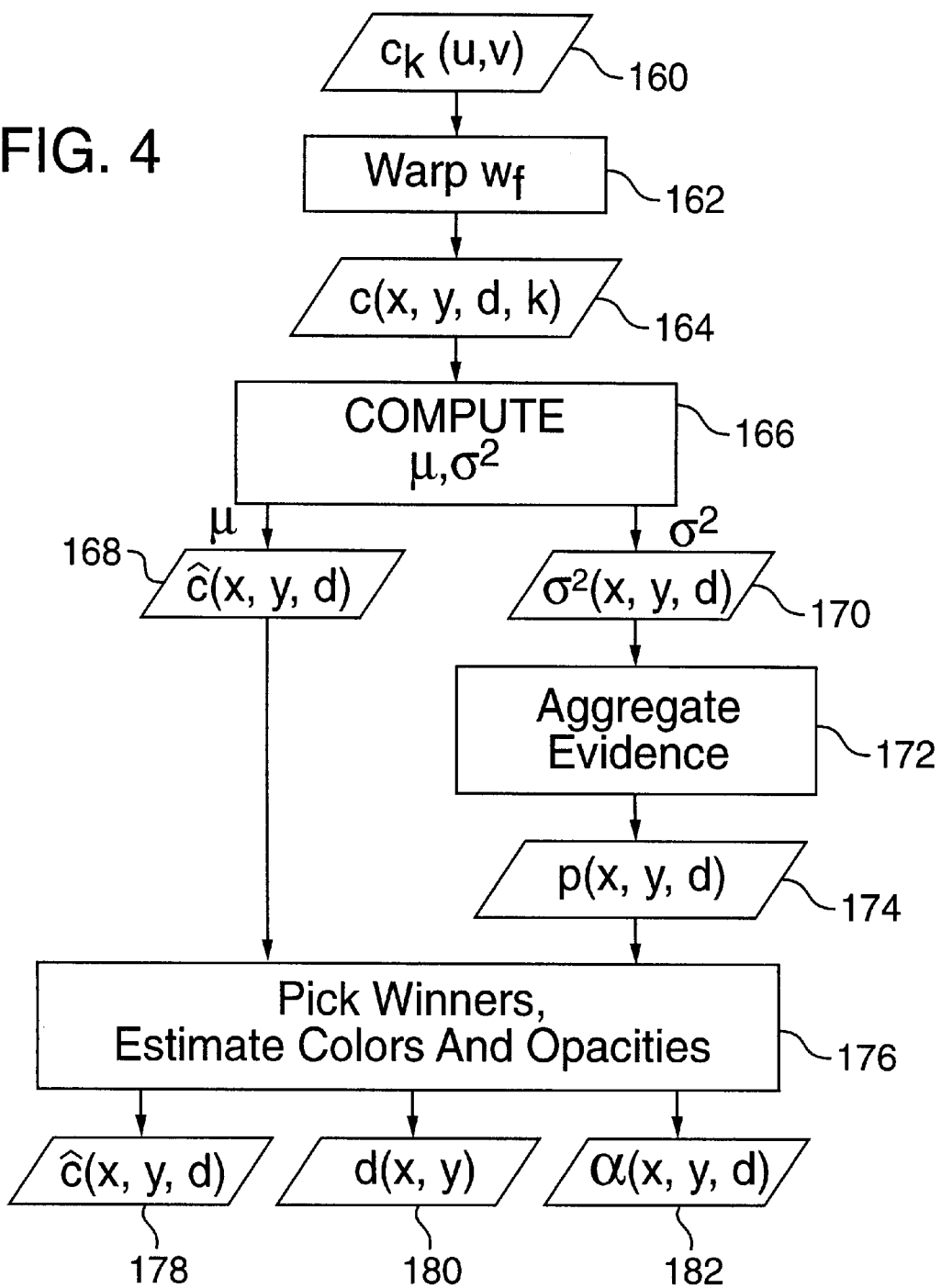

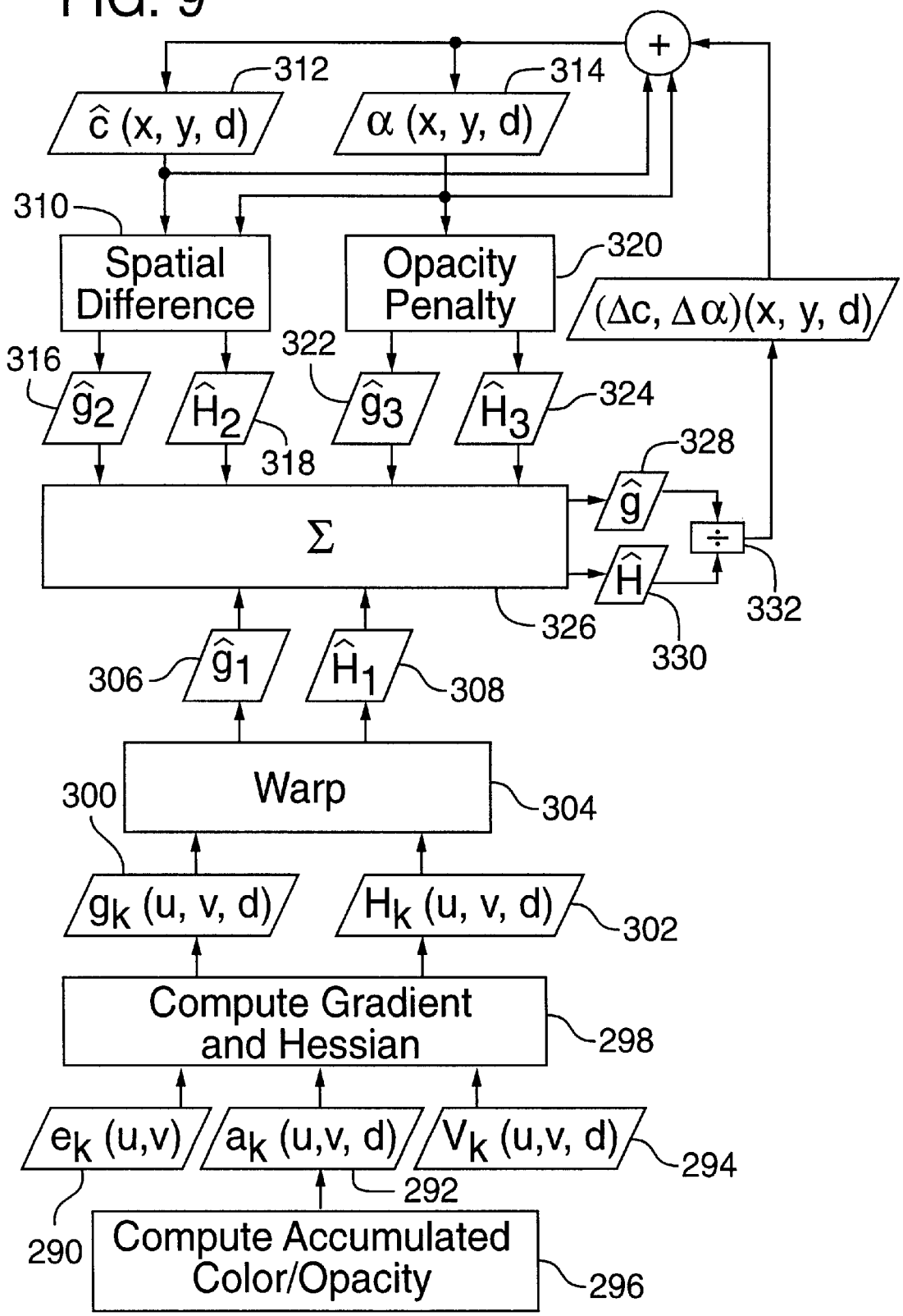

METHOD FOR PERFORMING STEREO MATCHING TO RECOVER DEPTHS, COLORS AND OPACITIES OF SURFACE ELEMENTS

FIELD OF THE INVENTION

The invention relates generally to an image processing field called computer vision and more specifically relates to stereo matching within this field.

BACKGROUND OF THE INVENTION

Stereo matching refers generally to a method for processing two or more images in an attempt to recover information about the objects portrayed in the images. Since each image is only two dimensional, it does not convey the depth of the objects portrayed in the image relative to the camera position. However, it is possible to recover this depth information by processing two or more images of the same object taken from cameras located at different positions around the object. There are two primary elements to extracting depth information: 1) finding picture elements (pixels) in each image that correspond to the same surface element on an object depicted in each image; and 2) using triangulation to compute the distance between the surface element and one of the cameras. Knowing the camera position and the corresponding picture elements, one can trace a ray from each camera through corresponding picture elements to find the intersection point of the rays, which gives the location of a surface element in three-dimensional (3D) space. After computing this intersection point, one can then compute the distance or "depth" of the surface element relative to one of the cameras.

The difficult part of this method is finding matching picture elements in two or more input images. In the field of computer vision, this problem is referred to as stereo matching or stereo correspondence. Finding matching picture elements or "pixels" is difficult because many pixels in each image have the same color.

In the past, researchers have studied the stereo matching problem in attempt to recover depth maps and shape models for robotics and object recognition applications. Stereo matching is relevant to these applications because it can be used to compute the distances or "depths" of visible surface elements relative to a camera from two or more input images. These depth values are analogous to the depths of surface elements on a 3D object (sometimes referred to as the Z coordinate in an (x,y,z) coordinate system) in the field of computer graphics. Depth or "z" buffers are a common part of 3D graphics rendering systems used to determine which surface elements of 3D objects are visible while rendering a 3D scene into a two-dimensional image.

The term "disparity" is often used in the computer vision field and represents the change in position of a surface element on an object when viewed through different cameras positioned around the object. Since disparity is mathematically related to depth from the camera, it can be used interchangeably with depth. In other words, once one has determined disparity, it is trivial to convert it into a depth value.

A typical stereo matching algorithm will attempt to compute the disparities for visible surface elements. These disparities can be converted into depths to compute a depth map, an array of depth values representing the depth of visible surface elements depicted in an image.

Recently, depth maps recovered from stereo images have been painted with texture maps extracted from the input images to create realistic 3D scenes and environments for virtual reality and virtual studio applications. A "texture map" is another term commonly used in computer graphics referring to a method for mapping an image to the surface of 3D objects. This type of stereo matching application can be used to compute a 3D virtual environment from a video sequence. In a game, for example, this technology could be used to create the effect of "walking through" a virtual environment and viewing objects depicted in a video sequence from different viewing perspectives using a technique called view interpolation. View Interpolation refers to a method for taking one image and simulating what it would look like from a different viewpoint. In another application called z-keying, this technology can be used to extract depth layers of video objects and then insert graphical objects between the depth layers. For example, z-keying can be used to insert computer-generated animation in a live video sequence.

Unfortunately, the quality and resolution of most stereo algorithms is insufficient for these types of applications. Even isolated errors in the depth map become readily visible when synthetic graphical objects are inserted between extracted foreground and background video objects.

One of the most common types of errors occurs in stereo algorithms when they attempt to compute depth values at the boundary where a foreground object occludes a background object (the occlusion boundary). Some stereo algorithms tend to "fatten" depth layers near these boundaries, which causes errors in the depth map. Stereo algorithms based on variable window sizes or iterative evidence aggregation can in many cases reduce these types of errors. (T. Kanade and M. Okutomi. A stereo matching algorithm with an adaptive window: Theory and experiment. *IEEE Trans. Patt. Anal. Machine Intel.*, 16(9):920–932, September 1994) (D. Scharstein and R. Szeliski. Stereo matching with non-linear diffusion. In *Computer Vision and Pattern Recognition (CVPR '96)*, pages 343–350, San Franciso, Calif., June 1996). Another problem is that stereo algorithms typically only estimate disparity values to the nearest pixel, which is often not sufficiently accurate for tasks such as view interpolation.

While pixel level accuracy is sufficient for some stereo applications, it is not sufficient for challenging applications such as z-keying. Pixels lying near occlusion boundaries will typically be "mixed" in the sense that they contain a blend of colors contributed by the foreground and background surfaces. When mixed pixels are composited with other images or graphical objects, objectionable "halos" or "color bleeding" may be visible in the final image.

The computer graphics and special effects industries have faced similar problems extracting foreground objects in video using blue screen techniques. The term blue screen generally refers to a method for extracting an image representing a foreground object from the rest of an image. A common application of this technique is to extract the foreground image and then superimpose it onto another image to create special effects. For example, a video sequence of a spaceship can be shot against a blue background so that the spaceship's image can be extracted from the blue background and superimposed onto another image (e.g., an image depicting a space scene). The key to this approach is that the background or "blue screen" is comprised of a known, uniform color, and therefore, can be easily distinguished from the foreground image.

Despite the fact that the background color is known, blue screen techniques still suffer from the same problem of mixed pixels at the occlusion boundary of the foreground object (e.g., the perimeter of the spaceship in the previous example). To address the problems of mixed pixels in blue screen techniques, researchers in these fields have developed techniques for modeling mixed pixels as combinations of foreground and background colors. However, it is insufficient to merely label pixels as foreground and background because this approach does not represent a pixel's true color and opacity.

The term "opacity" (sometimes referred to "transparency" or "translucency") refers to the extent to which an occluded background pixel is visible through the occluding foreground pixel at the same pixel location. An image comprises a finite number of pixels arranged in a rectangular array. Each pixel, therefore, covers an area in two-dimensional screen coordinates. It is possible for sub-pixel regions of pixels at occlusion boundaries to map to surface elements at different depths (e.g., a foreground object and a background object). It is also possible for a pixel to represent a translucent surface such as window that reflects some light and also allows light reflected from a background object to pass through it. In order for a pixel to represent the foreground and background colors accurately, it should represent the proper proportion of foreground and background colors in its final color values. The opacity value can be used to represent the extent to which a pixel is composed of colors from foreground and background surface elements.

As alluded to above, one way to approximate opacity is merely to assume some predefined blending factor for computing colors of mixed pixels. While this type of blending foreground and background colors can make errors at the occlusion boundaries less visible for some applications, it does not remove the errors and is insufficient for demanding applications such as z-keying. Moreover, in the context of stereo matching, the background colors are usually not known. A stereo matching method has to attempt to distinguish background and foreground colors before "mixed" pixels can be computed.

SUMMARY OF THE INVENTION

The invention provides an improved stereo method that simultaneously recovers disparity, color, and opacity from two or more input images. In general, the objective is to use the input images to reconstruct 3D surfaces of the objects depicted in the input images. We sometimes refer to these surfaces as a collection of visible (or partially visible) surface elements. Our stereo method is designed to recover the disparities, colors and opacities of the visible surface elements. While we often refer to "colors," it is important to note that the invention applies to gray-scale images as well as color images using any of a variety of known color spaces.

The first stage of the method is to formulate a general disparity space. This generally involves selecting a projective sampling of a 3D working volume. The working volume is a space containing the objects depicted in the input images. In one particular implementation, this stage includes selecting the position and orientation of a virtual camera, and selecting the spacing and orientation of disparity planes. The end result is an (x,y,d) general disparity space, where d represents disparity (also referred to as a disparity layer or plane). The general disparity space serves as a common reference for each of the input cameras that generated the input images.

The next stage is to make some initial estimates of colors and opacities in the general disparity space. This stage includes transforming the input images from their screen coordinates to the cells in the general disparity space. This stage can be implemented by sampling the input images to collect k colors corresponding to the k input images for each of the cells in the general disparity space. Within this stage, there are a number of ways to arrive at the initial estimates. In general, this stage computes statistics on the k colors for each cell, and then uses these statistics to arrive at initial color estimates. This stage also estimates disparities and opacities by using the statistics to pick cells that are most likely to reside on a visible surface element. For better results, this stage can also use evidence aggregated from neighboring samples to improve the statistical analysis (aggregating evidence).

One specific implementation computes statistics on k colors at each cell, including the mean and variance. This implementation then estimates a cell's color as the mean color. It selects a winning disparity for each (x,y) column in disparity space that has a variance below a threshold and is clearly more likely to be located at a visible surface element relative to other cells in the column. Finally, it estimates initial opacities by assigning binary opacities to cells, where cells that are clearly more likely to be on visible surface elements are initially set to totally opaque and other cells are set to totally transparent.

The next stage is to refine the initial estimates. One way to accomplish this is to compute visibility values and then use these visibility values to make better estimates of colors, opacities and disparities. Visibility is the extent to which an element in 3D space is visible from a given input camera location. One implementation of the method computes visibility values by projecting opacity estimates from general disparity space to the (u,v,d) space of each input camera, and then determining visibility at the (u,v,d) coordinates from the opacity values. The (u,v,d) space of an input camera is a 3D disparity space from the perspective of a kth input camera, where u and v are pixel coordinates in the input image and d is the disparity. The disparity d is untransformed when mapped backward or forward between general disparity space and the disparity space of an input camera.

The visibility information can then be associated with color values of the input images, mapped into the general disparity space. When associated with color samples collected at each cell, the visibility information can be used to compute weighted statistics, where a color sample has less weight if the location of the sample is not visible from the camera it comes from.

Another way to refine the estimates, which can be used in conjunction with visibility, is to use the initial estimates as input to an iterative refining process. In each iteration, the estimates can be projected back into the input cameras to compute re-projected images. The objective in this particular approach is to compute the error between the re-projected images and the input images, and use this error to adjust the current estimates. In addition to error, other costs or constraints can be used to determine how to adjust the current color and opacity estimates and make them more accurate.

In particular, the process of re-projecting the estimates can include: 1) transforming disparity planes to the (u,v,d) coordinate space of the input cameras; and 2) compositing the layers to compute the re-projected image. The disparity planes are comprised of a rectangular array (x,y) of the current color and opacity estimates for the cells in a disparity plane, d. The iterative refining process can be implemented as a cost minimization problem, using the error and possibly other constraints as cost functions to determine how to adjust the current estimates.

This stereo matching method addresses many of the problems with conventional stereo methods outlined above. For example, it provides an improved method for recovering colors and disparities in partially occluded regions. It also deals with pixels containing mixtures of foreground and background colors more effectively. This method can also provide more accurate color and opacity estimates, which can be used to extract foreground objects, and mix live and synthetic imagery with fewer visible errors.

Further advantages and features will become apparent with reference to the following detailed description and accompanying drawings.

BRIEF DESCRIPTION OF THE DRAWINGS

FIGS. 3A–C are diagrams illustrating an example of the orientation and position of input cameras relative to a general disparity space.

FIG. 4 is a more detailed flow diagram illustrating methods for estimating a disparity surface.

FIG. 9 is a flow diagram illustrating a method for refining color and transparency estimates.

DETAILED DESCRIPTION

The invention provides a method for simultaneously recovering disparities, colors and opacities of visible surface elements from two or more input images. Before describing this method, we begin by describing an operating environment for software implementations of the method. We then describe the implementation details of the method.

Computer Overview

Figure 1:
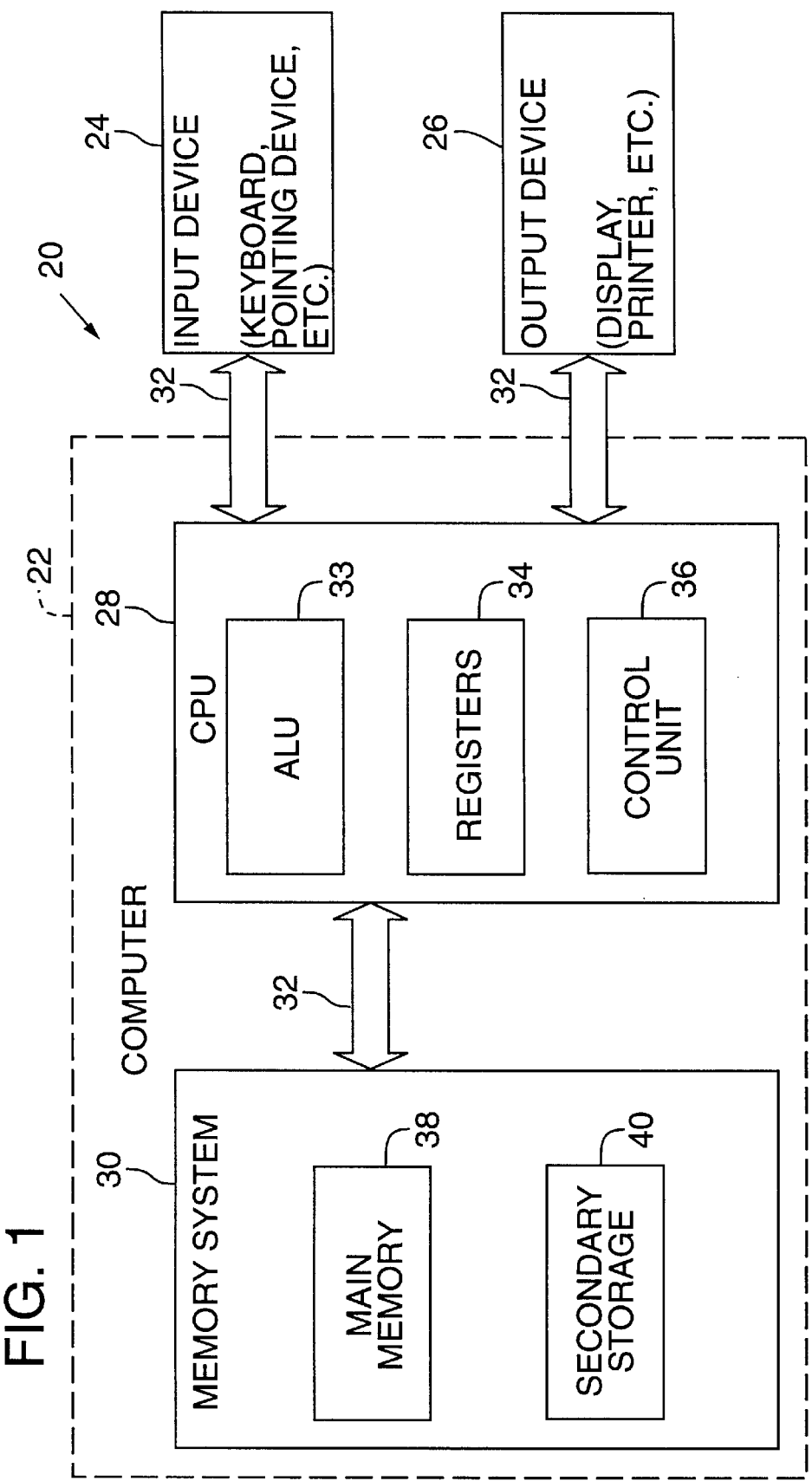
FIG. 1 is a general block diagram of a computer system that serves as an operating environment for our stereo matching method.

FIG. 1 is a general block diagram of a computer system that serves as an operating environment for an implementation of the invention. The computer system 20 includes as its basic elements a computer 22, one or more input devices 24 and one or more output device 26 including a display device.

Computer 22 has a conventional system architecture including a central processing unit (CPU) 28 and a memory system 30, which communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system. The computer can be implemented using any of a variety of known architectures and processors including an x86 microprocessor from Intel and others, such as Cyrix, AMD, and Nexgen, and the PowerPC from IBM and Motorola.

Input device 24 and output device 26 are typically peripheral devices connected by bus structure 32 to computer 22. Input device 24 may be a keyboard, pointing device, pen, joystick, head tracking device or other device for providing input data to the computer. A computer system for implementing our stereo matching methods receives input images from input cameras connected to the computer via a digitizer that converts pictures into a digital format.

The output device 26 represents a display device for displaying images on a display screen as well as a display controller for controlling the display device. In addition to the display device, the output device may also include a printer, sound device or other device for providing output data from the computer.

Some peripherals such as modems and network adapters are both input and output devices, and therefore, incorporate both elements 24 and 26 in FIG. 1.

Memory system 30 generally includes high speed main memory 38 implemented using conventional memory medium such as random access memory (RAM) and read only memory (ROM) semiconductor devices, and secondary storage 40 implemented in mediums such as floppy disks, hard disks, tape, CD ROM, etc. or other devices that use optical, magnetic or other recording material. Main memory 38 stores programs such as a computer's operating system and currently running application programs. The operating system is the set of software which controls the computer system's operation and the allocation of resources. The application programs are the set of software that performs a task desired by the user, making use of computer resources made available through the operating system. In addition to storing executable software and data, portions of main memory 38 may also be used as a frame buffer for storing digital image data displayed on a display device connected to the computer 22.

The operating system commonly provides a number of functions such as process/thread synchronization, memory management, file management through a file system, etc.

Below we describe software implementations of a stereo matching method in some detail. This software can be implemented in a variety of programming languages, which when compiled, comprises a series of machine-executable instructions stored on a storage medium readable by a computer ("computer readable medium"). The computer readable medium can be any of the conventional memory devices described above in connection with main memory and secondary storage.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the computer industry.

As an alternative to using a general purpose computer, our stereo method, or parts of it, can be implemented using digital logic circuitry. For example, steps in our method could be implemented in special purpose digital logic circuitry to compute results more quickly and efficiently.

Implementation of the Stereo Method

Figure 2:
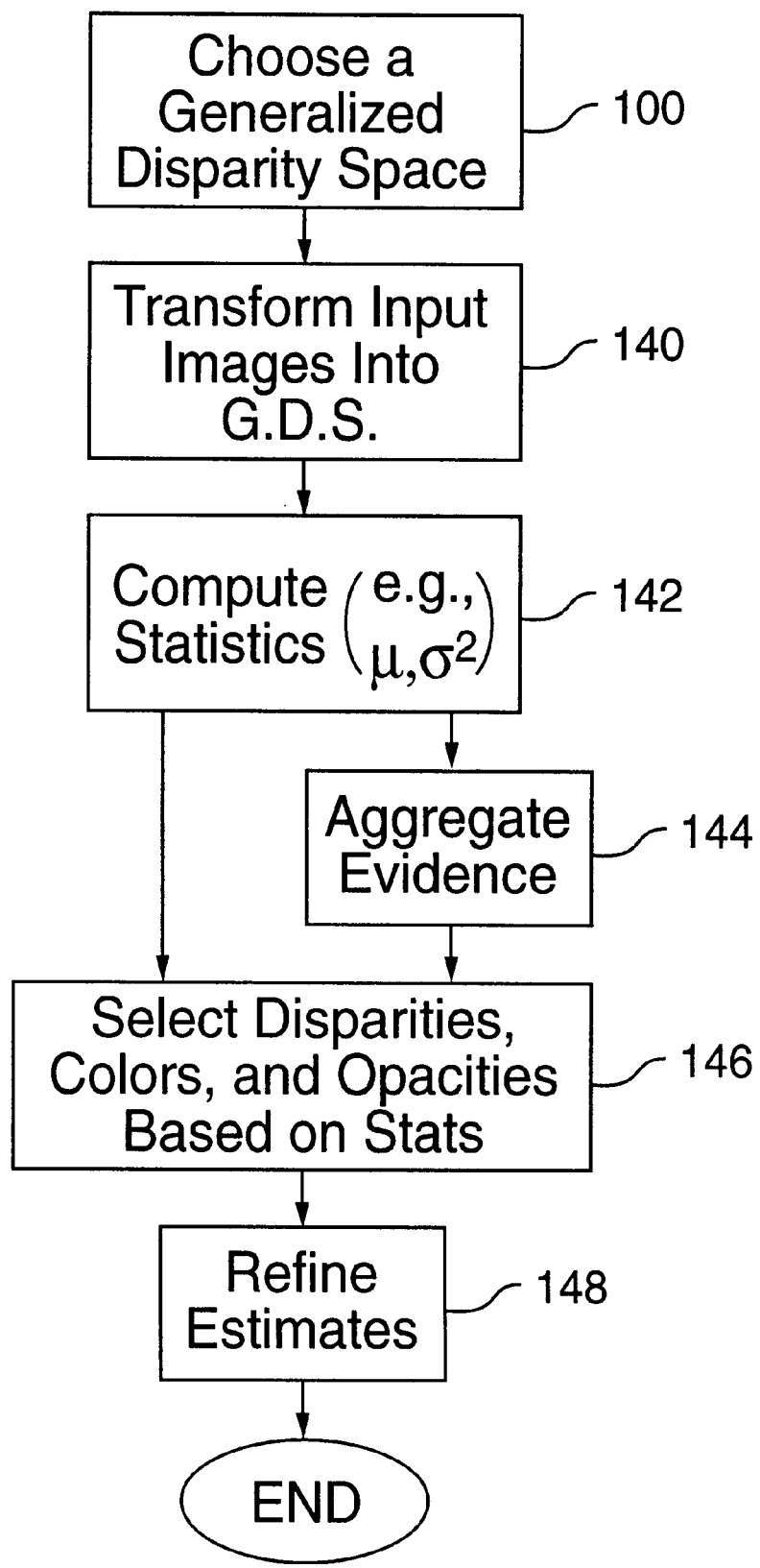
FIG. 2 is a general flow diagram illustrating a stereo method for estimating disparities, colors and opacities.

Having described the operating environment, we now focus on the implementation of our stereo method. We begin with an overview of the method, as illustrated in FIG. 2. Below, we introduce each of the steps shown in FIG. 2 and then describe each step in more detail.

Formulating a Generalized Disparity Space

In general, the first step 100 of the method is to formulate a representation of the 3D working volume of interest. This representation is called a generalized disparity space, a projective sampling of 3D space represented by an array of (x,y,d) cells. The x and y axes represent a two-dimensional array of samples in each disparity plane, d.

Before describing this general disparity space in more detail, it is helpful to consider an example of a working volume.

FIG. 3A is an example of a working volume 110 showing a 3D foreground object 112 in front of a flat background object 114. FIGS. 3B–C are top and side views of the working volume, showing the position of the foreground object 112 relative to the background object. To produce the input images, several cameras 116–122 are positioned around the object. The cameras each capture an input image depicting the object against the flat background. The cameras transfer this input image to a computer via a camera/computer interface. Depending on the camera, this interface may convert the image into a format compatible with the computer and the stereo method running in the computer.

The images can be monochrome or color. In both cases, the digitized form of each input image consists of a two dimensional array of pixels. For monochrome images, each pixel represents a gray-scale value, while for color images, each pixel represents a color triplet such as Red, Green, and Blue values.

FIGS. 3A–C show an example of a generalized disparity space, superimposed onto the working volume. To formulate a disparity space, the first step is to choose a virtual camera position and orientation. The second step is to choose the orientation and spacing of the disparity planes. The virtual camera 130 provides a frame of reference for the working volume and defines how each of the images map into the cells of the generalized disparity space. As shown, the generalized disparity space can be viewed as a series of disparity planes, each forming an (x,y) coordinate system, and each projecting into the virtual camera 130.

In this particular example, the generalized disparity space is comprised of regularly spaced (x,y,d) cells, shown as the intersections of the 3D grid. The (x,y,d) axes are orthogonal and evenly sampled. The spacing of the cells is more clearly illustrated in the top and side views (FIGS. 3B–C). The virtual camera 130 is considered to be spaced at an infinite distance away from the working volume such that the rays emanating from the virtual camera and all (x,y) columns in the d dimension are parallel.

This drawing shows only one example of a generalized disparity space. It is important to emphasize that this space can be any projective sampling of 3D space in the working volume of interest. The virtual camera can be located at the same position (coincident) with any of the input cameras, or at some other location. As another alternative, one can also choose a skewed camera model.

Having chosen a virtual camera position, one can also choose the orientation and spacing of the constant d planes ("disparity planes"). The relationship between d and disparity space can be projective. For example, one could choose d to be inversely proportional to depth, which is the usual meaning of disparity.

The virtual camera's position and the disparity plane spacing and orientation can be represented in a single 4×4 matrix $\hat{M}_0$, which represents a mapping from world coordinates $X:(X, Y, Z, 1)$ to general disparity coordinates $\hat{x}_0 :(x, y, d, 1)$, $\hat{x}_0 = \hat{M}_0 X$. The inverse of the camera matrix maps coordinates in general disparity space to world coordinates, $X = \hat{M}_0^{-1} \hat{x}_0$.

Let $X_k: (u, v, 1)$ be the screen coordinates of the kth input camera. The camera matrix $M_k$ is the mapping from world coordinates to the kth camera's screen coordinates, $x_k = M_k X$.

In equations where the variables are expressed in homogenous coordinates, the quantities on each side of the expression are "equal" in the sense that they are equal up to a scale.

Transforming the Input Images into Generalized Disparity Space

In order to compute the k values for each cell, the stereo matching method shown in FIG. 2 re-samples the input images by mapping the pixels in each of the input images to the cells in the generalized disparity space. This part of the method is illustrated as step 140 in FIG. 2.

If one assumes the k input cameras are being sampled along a fictitious k dimension, general disparity space can be extended to a 4D space, (x,y,d,k) with k being the fourth dimension. The mapping of k input images to a given cell produces k values for each cell. For color images for example, there are k color triplets for each cell. These color values can be thought of as the color distributions at a given location in the working volume. The color distributions with the smallest variance are more likely to represent matching pixels in the input images, and thus, are more likely to be located at a visible surface element on the object surface depicted in the input images.

Using the expressions for mapping from screen coordinates to world coordinates, and from general disparity coordinates to world coordinates, we can define a mapping between a pixel in an input image and an (x,y,d) cell as:

$$x_k = M_k X = M_k \hat{M}_0^{-1} \hat{x}_0 = H_k x_0 + t_k d = [H_k + t_k [0\ 0\ d]] x_0 \quad (1)$$

where $x_0:(x, y, 1)$ is the 2D disparity space coordinate without the d component, and $H_k$ is the homography mapping relating the rectified and non-rectified version of the input image k (i.e., the homography mapping for d=0), and $t_k$ is the image of the virtual camera's center of projection in image k, (i.e., the epipole).

This mapping can be implemented so that it first rectifies an input image and then re-projects it into a new disparity plane d using:

$$x_k = H_k x'_0 = H_k x_0 + t_k d \quad (2)$$

where $x'_0$ is the new coordinate corresponding to $x_0$ at d=0. From this, $$x'_0 = x_0 + \hat{t}_k d = (I + \hat{t}_k [0\ 0\ d]) x_0 = \hat{H}_k x_0 \quad (3)$$

where $\hat{t}_k = H_k^{-1} t_k$ is the focus of expansion, and the new homography $\hat{H}_k$ represents a simple shift and scale. It has been shown that the first two terms of $\hat{t}_k$ depend on the horizontal and vertical displacements between the virtual camera 130 and the kth camera, whereas the third element is proportional to the displacement in depth (perpendicular to the d plane). Thus, if all the cameras are coplanar (regardless of their vergence), and if the d planes are parallel to the common plane, then the re-mappings of the rectified images to a new disparity correspond to pure shifts.

These expressions defining the mapping from an input image to a cell in disparity space can be used to populate each cell in disparity space with k color triplets. The computation of the colors at a given cell contributed by an input image k can be expressed as:

$$c(x,y,d,k)=W_f(c_k(u,v);H_k+t_k[0,0,d]) \quad (4)$$

where c(x, y, d, k) is the pixel mapped into the generalized disparity space for input image k, $c_k$ (u, v) is the kth input image, and $W_f$ is the forward warping operator. Note that the color intensity values can be replaced with gray-scale values. The current implementation of this method uses bilinear interpolation of the pixel colors and opacities. More precisely, for each location (x, y, d, k), the value of $x_k$:(u,v,1) is computed using equation (1). Since $X_k$ is generally a floating point number, the 4 color values surrounding the $x_k$ location are extracted and blended using the bilinear formula:

$$(1-\alpha)(1-\beta)c(i,j)+(1\alpha)(\beta)c(i,j+1)+(\alpha)(1-\beta)c(i+1,j)+\alpha\beta c(i+1,j+1) \quad (5)$$

where i and j are the largest integers less than or equal to u and v and $\alpha$ and $\beta$ are the fractional parts of u and v.

As explained further below, opacities are selected based on an initial estimate of the disparity surface and then refined. The bilinear interpolation of opacities refers to both the initial estimates and subsequent refined values.

Computing Statistics Used to Estimate Colors, Disparities and Opacities

As shown in FIG. 2, the next step 142 is to compute statistics on the k samples of each cell in an attempt to find the cell in each (x,y) column that is most likely to lie on a visible surface element. Stated generally, this step computes the probabilities that cells represent visible surface elements based on the distribution of the pixel values at each cell. In the context of color images, the method looks at the statistics (e.g., the mean and variance) computed for the k color samples at each (x,y,d) cell in the (x,y) column to find a cell that is most likely to reside on a visible surface element. In one implementation, the method includes computing the mean color and variance for the k samples. One way to select the "winning" cell or winning disparity (i.e., the disparity value for the cell that is most likely to reside on a visible surface element based on the statistics) is to select the cell with the lowest variance. Certainly other statistical analyses can be used to select a winning disparity value.

Aggregating Evidence

One way to improve the likelihood that the method does choose the correct disparity at each (x,y) column is to perform additional processing. The method looks at other evidence such as the statistics at neighboring cells to increase the likelihood of finding the correct disparity. In theory, the color values of the k input images at the winning disparity should have zero variance. However, in practice, image noise, fractional disparity shifts, and photometric variations (e.g., specularities) make it unlikely that a cell will have zero variance. The variance will also be arbitrarily high in occluded regions, such as the area where the foreground object occludes the background object in FIG. 2. In this portion of the working volume, occluded pixels will have an impact on the selection of a disparity level, leading to gross errors.

One way to disambiguate matches is to aggregate evidence. There are a number of known techniques for aggregating evidence to disambiguate matches. Conventional techniques for aggregating evidence can use either two-dimensional support regions at a fixed disparity (favoring front-to-parallel surfaces), or three-dimensional in (x,y,d) space (allowing slanted surfaces). Two-dimensional evidence aggregation has been done using both fixed square windows (traditional) and windows with adaptive sizes. Three-dimensional support functions include a limited disparity gradient, Prazdny's coherence principle (which can be implemented using two diffusion processes), and iterative (non-linear) evidence aggregation.

Selecting disparities, colors and opacities

The next step 146 in the method is to select disparities, colors and opacities based on the statistical analysis from step 142 and/or aggregating evidence of step 144. It is significant to note that the method selects opacity values, in addition to disparities and colors.

One way to make the initial estimate of opacities is to start with binary opacities such that: ($\alpha$=1, (totally opaque) corresponds to a cell in an (x,y) column meeting defined criteria, and $\alpha$=0 (totally transparent) for all other cells. The defined criteria measures how likely a cell is located at a visible surface element. One example of this criteria is a test to determine whether the variance (scatter in color values) is below a threshold. Another part of this criteria can be the extent to which the disparity of the cell is more likely to represent a visible surface element relative to other cells in the column.

The initial estimates do not have to be binary opacities. For example, the initial estimate can be set to 1 if some defined criteria is satisfied and some value less than one (between 1 and 0) based on how close the cell is to the defined criteria, for those cells that do not pass the criteria.

The initial estimates on color values are also based on the statistics. For example, the method can include selecting the mean color computed from the k pixels for each cell as the initial color estimate for a cell.

At the end of this step 146, the method can create a new (x,y,d) volume based on the statistics computed for the k pixels at each cell and the aggregating evidence. To set up the volume for a refinement stage, one implementation of the method sets the colors to the mean value and sets the opacity to one for cells meeting the criteria, and 0 otherwise.

Refining Estimates of Disparities, Colors and Opacities

After selecting the disparities, colors and opacities, one alternative is to stop processing and use these elements as the output of the stereo method. A preferred approach, especially in view of the problem with mixed pixels at occlusion boundaries, is to use the disparities, colors and opacities as initial estimates and then refine these estimates as generally reflected in step 148.

The initial opacity values can be used in a refinement process that simultaneously estimates disparities, colors, and opacities which best match the input images while conforming to some prior expectations on smoothness.

An alternative refining process is take the binary opacities and pass them through a low pass filter to smooth the discontinuities between opaque and transparent portions. Another possibility is to recover the opacity information by looking at the magnitude of the intensity gradient, assuming that the stereo method can sufficiently isolate regions which belong to different disparity levels.

Having described the steps of the stereo method in general, we now describe a specific technique for computing initial estimates of colors, disparities, and opacities (steps 140–146 of FIG. 2). FIG. 4 is a flow diagram illustrating this technique. In this diagram, the slanted blocks correspond to a representation of data in the computer, whereas the rectangular blocks (operator blocks) correspond to an operation on the data.

The technique for estimating an initial disparity surface begins by taking each kth input image $c_k$(u, v) 160 as input and performing a warp on it to transform the pixels in the input image to general disparity space. The warp operator 162 samples the pixels in the k input images to populate the 4D (x,y,d,k) space. This operation produces color triplets c(x,y,d,k) 164 in the 4D (x,y,d,k) space.

The next step 166 in this method is to compute the mean and variance for the k color triplets at each cell in generalized disparity space. The mean calculation yields a color estimate $\hat{c}(x,y,d) = [R\ G\ B]^T$ for each of the cells in the general disparity space (represented as item 168 in FIG. 4).

This particular implementation of the method uses the variance 170 as input to a stage for aggregating evidence (172). The method then aggregates evidence using a variation of the technique described in D. Scharstein and R. Szeliski. Stereo matching with non-linear diffusion. In *Computer Vision and Pattern Recognition* (*CVPR* '96), pages 343–350, San Francisco, Calif., June 1996. In general, this technique for aggregating evidence involves looking at evidence computed for neighboring pixels to improve the confidence of selecting a d value in each (x,y) column that lies on a visible surface element. One possible implementation can be represented as follows:

$$\sigma_i^{t+1} \leftarrow a \hat{\sigma}_i^t + b \sum_{j \in N_4(i)} \hat{\sigma}_j^t \qquad (6)$$

where $\sigma_i^t$ is the variance of a pixel i at iteration t, $\hat{\sigma}_i^t = \min(\sigma_i^t, \sigma_{max})$ is a more robust (limited) version of the variance, and $N_4$ represents the four nearest neighbors. In a current implementation, we have chosen (a,b,c)=(0.1, 0.15, 0.3) and $\sigma_{max}$=16. The result of aggregating evidence is a confidence value 174 for each cell in general disparity space, p(x,y,d).

At this point, the method selects binary opacities in each (x,y) column based on criteria indicating whether or not a given cell is likely to correspond to a visible surface element. The objective is to find a clear winner in each column by using a demanding test that a cell must satisfy in order to be assigned an initial opacity of one (totally opaque). The criteria in this implementation includes both a threshold on variance and a requirement that the disparity is a clear winner with respect to other disparities in the same (x,y) column. To account for resampling errors which occur near rapid color luminance changes, the threshold can be made proportional to the local variation within an n×n window (e.g., 3×3). One example expression for the threshold is $\theta = \theta_{min} + \theta_a \text{Var}_{3\times3}$.

After picking winners as described above, the initial estimates include:

$\hat{c}(x,y,d)$: the mean colors for each cell (178);
  d(x,y): the winning disparity for each column (180); and
  $\alpha(x,y,d)$: binary opacities in the 3D general disparity space (182).

These initial estimates can then be used in a refinement stage to improve upon the accuracy of the initial estimates.

Figure 5:
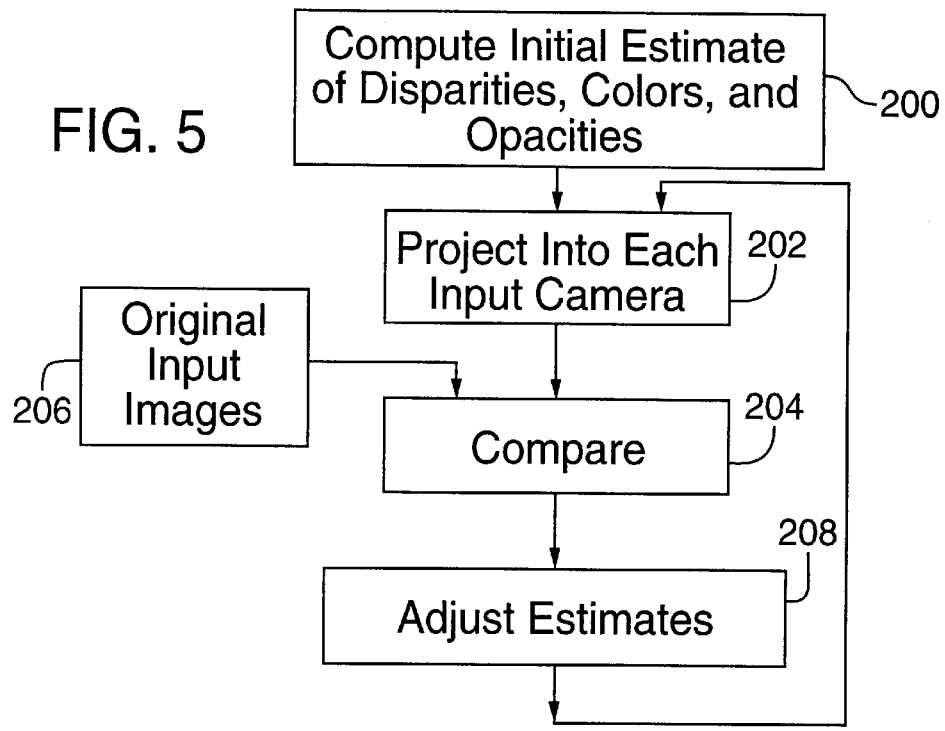
FIG. 5 is a general flow diagram illustrating a method for refining estimates of a disparity surface.

FIG. 5 is a flow diagram generally depicting a method for refining the initial estimates of the disparities, colors and opacities. The first step 200 summarizes the approach for arriving at the initial estimates as described in detail above. Once we have computed the initial estimates, we have an initial (x,y,d) volume with cells having estimated color and opacity (e.g., binary opacity in the specific example above), [R G B $\alpha$].

The initial estimates can then be projected back into each of the input cameras using the known transformation, $$x_k = M_k X = M_k M_0^{-1} \hat{x}_0,$$

between a camera's screen coordinate and a coordinate (location of a cell) in general disparity space. Re-projecting the initial estimates generally includes a transformation (or warp) and a compositing operation. A disparity plane can be warped into a given input camera's frame and then composited with other warped data using the estimated opacities to compute accumulated color values in the camera's frame. This re-projection step is generally reflected in block 202 of FIG. 5.

As shown in step 204, the re-projected values can then be compared with the pixels in the original input images 206 to compute the difference between re-projected pixels and the original pixels at corresponding pixel locations in the input images.

The error computed in this step can then be used to adjust the estimates as shown generally in step 208. In one implementation explained further below, we adjust the color and opacity estimates so that the re-projected pixels more closely match the input images. The specific criteria used to adjust the estimates can vary. Another criteria for adjusting the estimates is to make adjustments to the color and opacity values to improve continuity of the color and opacity values in screen space.

The stereo matching method can either stop with the current estimates or repeat the steps of re-projecting current estimates, computing the error, and then adjusting estimates to reduce the error. This iterative process is one form of refining the estimates and simultaneously computing disparities, opacities and colors. Within the scope of our stereo matching method, there are a number of alternative ways of refining estimates of colors, disparities and opacities. Below, we describe implementation details of the re-projection step and describe methods for refining estimates in more detail.

Figure 6:
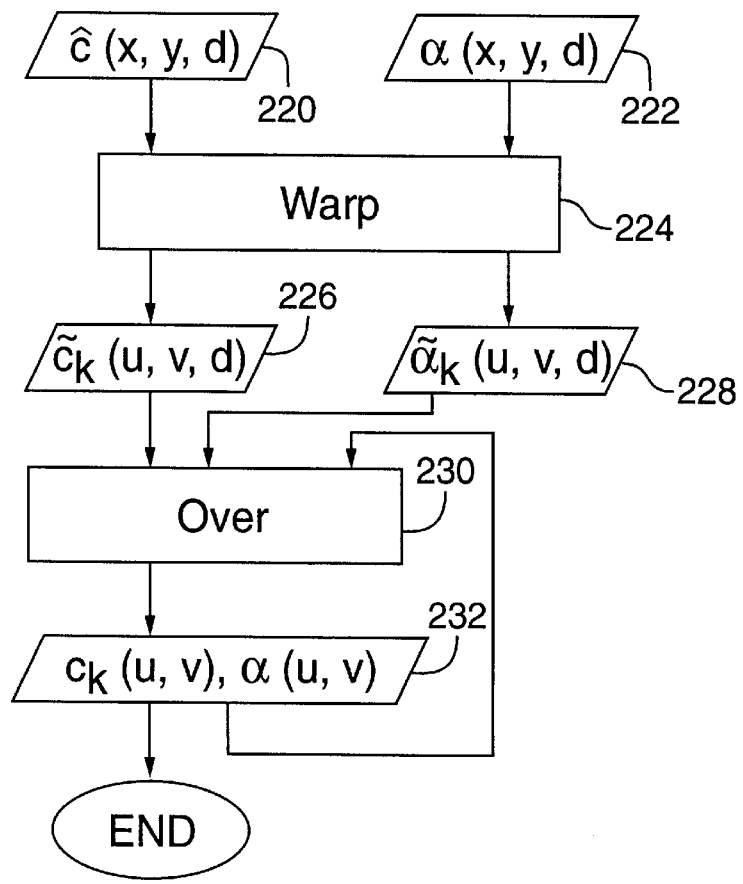
FIG. 6 is a flow diagram illustrating a method for re-projecting values in disparity space to the input cameras.

FIG. 6 is a flow diagram illustrating a specific implementation of the re-projection stage 202 of FIG. 5. This diagram depicts only one example method for re-projecting estimates into the frames of the input cameras. Assuming the same conventions as FIG. 4, the input to the re-projection stage includes both color estimates, $\hat{c}(x,y,d)$ (220), and opacity estimates, $\alpha(x,y,d)$ (222), in general disparity space (the (x,y,d) volume). In this implementation, the re-projection stage views the (x,y,d) volume as a set of potentially transparent acetates stacked at different d levels. Each acetate is first warped into a given input camera's frame using the known homography:

$$X_k = H_k X_0 + t_k d = [H_k + t_k[0,0,d]] x_0 \qquad (7)$$

and then the warped layers are composited back-to-front. This combination of a warp and composite operations is referred to as a warp-shear. It is important to note that other methods for transforming and compositing translucent image layers can be used to re-project the color values to the input camera frames.

The resampling operation for a given layer d into the frame of a camera k can be written as:

$$\tilde{c}_k(u,v,d) = W_b(\hat{c}(x,y,d); H_k + t_k[0,0,d])$$

$$\alpha_k(u,v,d) = W_b(\alpha(x,y,d); H_k + t_k[0,0,d]) \qquad (8)$$

where $\hat{c}$ is the current color estimate [R G B] and $\hat{\alpha}$ is the current opacity estimate at a given (x,y,d) cell, $\tilde{c}_k$ and $\alpha_k$ are the resampled layer d in camera k's coordinate system, and $W_b$ is the resampling operator derived from the homography in the previous paragraph. Note that the warping function is linear in the colors and opacities being resampled, i.e, the resampled colors and opacities can be expressed as a linear function of the current color and opacity estimates through sparse matrix multiplication.

In FIG. 6, the warp portion of the re-projection stage is represented as block 224. The resampled layer is represented by $\tilde{c}_k$ and $\alpha_k$ (226,228).

After resampling a layer, the re-projection stage composites it with another resampled layer using the standard Over operator (foreground over background layer=foreground color+(1-opacity of foreground pixel)(background color) (230). Each subsequent layer is composited with the accumulated layers from previous Over operations.

In this implementation, the reprojection stage composites the resampled layers in back-to-front order, namely, from the minimum d layer (maximum depth) to the maximum d layer (minimum depth) relative to the camera, where the maximum d layer is closest to the camera. The result of the compositing operation 230 is a re-projected image layer, including opacity (232).

One way to refine the disparity estimates is to prevent visible surface pixels from voting for potential disparities in the regions they occlude. To accomplish this, we build a (x, y, d, k) visibility map, which indicates whether a given camera k can see a voxel (cell in disparity space) at location (x, y, d). One way to construct such a visibility map is to record the disparity value for each (u, v) pixel which corresponds to the topmost opaque pixel seen during the compositing step. Note that it is not possible to compute visibility in (x, y, d) disparity space since several opaque pixels may project to the same input camera pixel.

In this example, the process of computing the visibility includes finding the top most opaque pixel for each (u,v) column in the dresampled layers per input camera. The visibility and opacity values can be interpreted as follows:

$V_k=1, \alpha_k=0$: free space (i.e., no objects in the working volume);
$V_k=1, \alpha_k=1$: surface voxel visible in image k;
$V_k=1, \alpha_k=?$: voxel not visible in image k.

Another way to define visibility is to take into account partially opaque voxels when constructing a visibility map for each input camera. A visibility map can be computed by taking each layer of resampled opacity in front to back order and computing visibility as follows:

$$V_k(u, v, d-1) = V_k(u, v, d)(1 - \tilde{\alpha}_k(u, v, d)) = \prod_{d'=d_{max}}^{d_{min}} (1 - \tilde{\alpha}_k(u, v, d')) \quad (9)$$

with the initial visibilities set to 1, $V_k(u,v,d_{max})=1$.

Using the visibilities, the compositing operation can be expressed as:

$$\tilde{c}_k(u, v) = \sum_{d=d_{min}}^{d_{max}} \tilde{c}_k(u, v, d) V_k(u, v, d). \quad (10)$$

Figure 7:
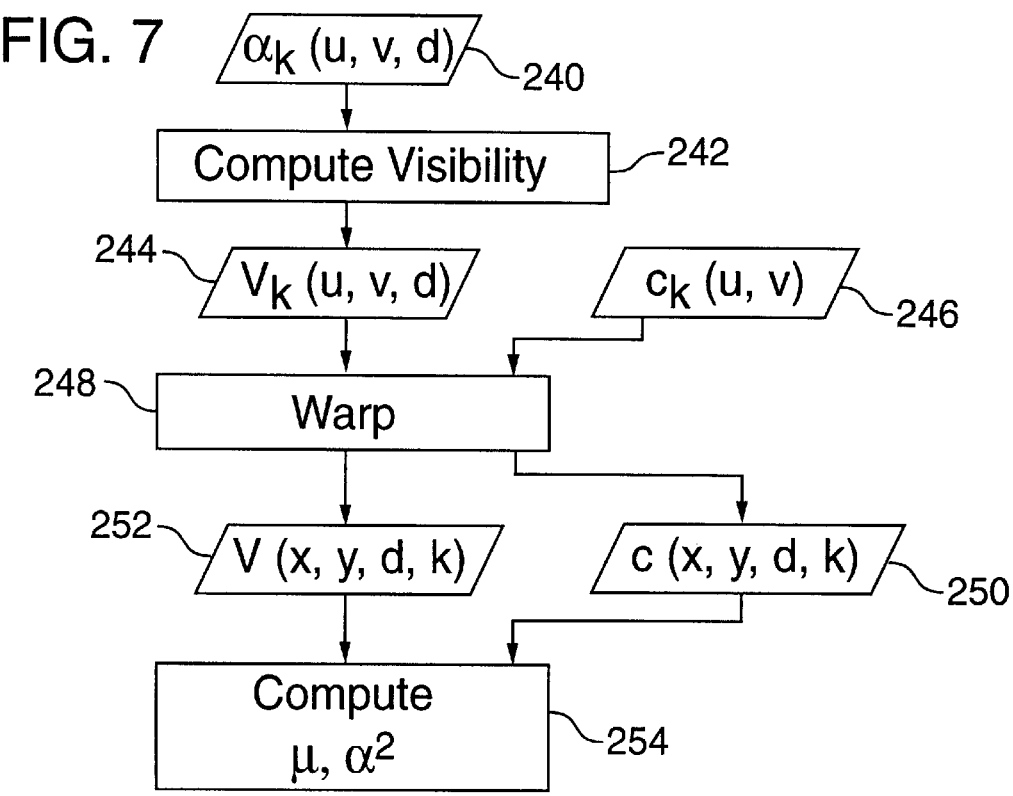
FIG. 7 is a flow diagram illustrating a method for improving disparity estimates using a visibility map.

FIG. 7 is a flow diagram illustrating how the visibility map can be used to refine the initial disparity estimates. The first step is to take the resampled opacity 240 and compute the visibility (242) to construct a visibility map $V_k(u,v,d)$ (244) for each input camera.

Next, the list of color samples in an input image can be updated using the visibility map corresponding to the camera:

$$c_k(u,v,d) = c_k(u,v) V_k(u,v,d). \quad (11)$$

Substituting $c_k(u,v,d)$ for $c_k(u,v)$ in the expression for mapping an input image into disparity space, we obtain a distribution of colors in (x,y,d,k) space where each color triplet has an associated visibility value. The updating of color samples $c_k$ 246 and subsequent mapping to disparity space is represented by the Warp operator block 248 in FIG. 7. The Warp (248) populates the cells in general disparity space with color samples mapped from the input images, c(xy,d,k) (250). These color samples have an associated visibility, V (x,y,d,k) (252), which determines the contribution of each color sample to the local color distribution at a cell.

The visibility data for each cell can be used to make more accurate estimates of colors and disparities. The visibility data determines the weight that a color sample will have in computing the color distribution at an (x,y,d) cell. For example, a color sample with a higher visibility value will contribute more than a color sample with a low visibility value.

As shown in block 254, the visibility values provide additional information when computing the statistics for the color samples at a cell. Without the visibility data, pixel samples from occluding surfaces can cause gross errors. With visibility, these pixel samples have little or no contribution because the visibility value is very low or zero for this cell. This use of visibility tends to decrease the variance, even for mixed pixels, because the visibility controls the extent to which color from occluding and occluded surfaces contribute to the color distribution at a cell. Partially occluded surface elements will receive color contribution from input pixels that are not already assigned to nearer surfaces. Since the variance is lower, the mean colors are more accurate, and it is easier to identify a disparity in each column that most likely represents a visible surface element.

While the use of visibility improves the quality of the disparity map and color estimates (mean colors), it does not fully address the problem of recovering accurate color and opacity data for mixed pixels, i.e, pixels near rapid depth discontinuities or translucent pixels. To more accurately compute color and opacity for mixed pixels, we have developed an approach for refining initial estimates of color and opacity.

Above, in FIG. 5, we gave an overview of this method for refining initial estimates. In general, this method includes computing estimates, re-projecting the estimates back into the input cameras, computing the error, and then adjusting the estimates. In FIG. 6, we described a specific implementation of the re-projection step. We now proceed to describe how to compute error in the color estimates.

Figure 8:
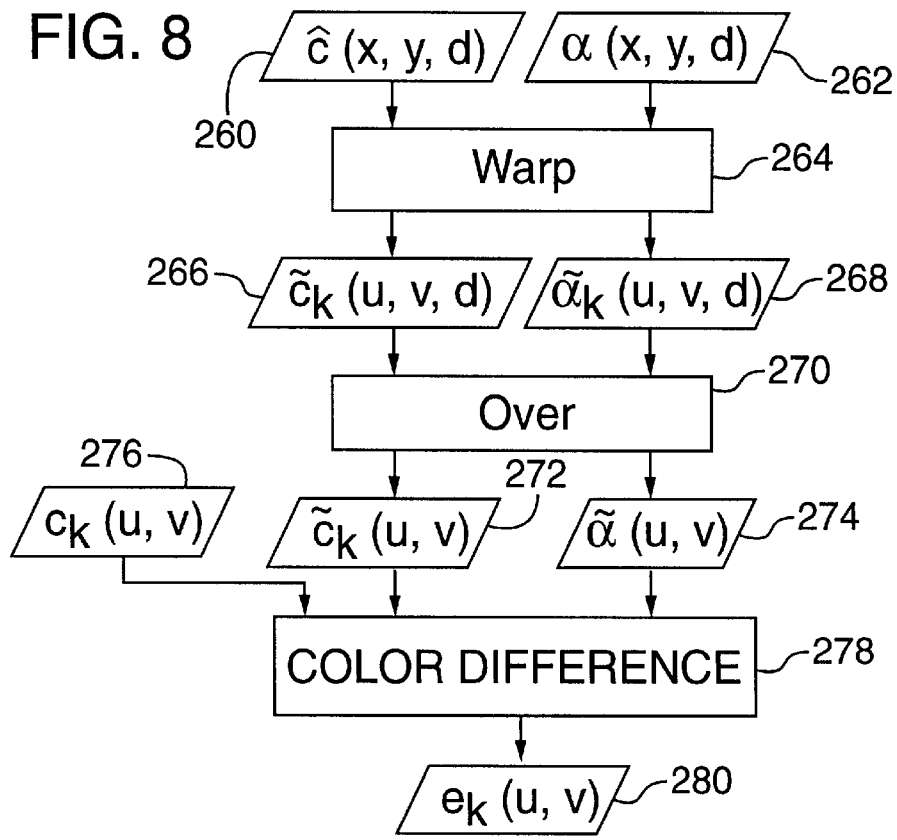
FIG. 8 is a flow diagram illustrating a method for re-projecting values from disparity space to the input cameras to compute error.

FIG. 8 is a flow diagram illustrating a method for computing error between the re-projected color samples and the input color samples at corresponding pixel locations. This diagram is quite similar to FIG. 6, and therefore does not require much elaboration. The task of computing error begins with the current color (260) and opacity estimates (262) in disparity space. These estimates are first warped (264) into (u,v,d) space of the respective input cameras to produce resampled d layers with color and opacity (266, 268). Next, a compositor operator (over, 270) combines the resampled layers into a resampled image layer, including color (272) and opacity (274). The resampled color values 272 are then compared with the input color values 276 at corresponding pixel locations (u,v) to compute error values at the pixel locations (u,v). This step is represented as the color difference block 278 in FIG. 8, which produces error values 280 for each (u,v) location for each of the input cameras, k.

FIG. 9 illustrates a detailed method for adjusting the estimates. This particular method adjusts the estimates based on the error values and two additional constraints: 1) continuities on colors and opacities; and 2) priors on opacities. Specifically, we adjust estimates using a cost minimization function having three parts: 1) a weighted error norm on the difference between re-projected images and the original input images:

$$C_1 = \sum_{(u,v)} \rho_1(\tilde{c}_k(u,v) - c_k(u,v)); \quad (12)$$

2) a smoothness constraint on the colors and opacities:

$$C_2 = \sum_{(x,y,d),(x',y',d') \in N(x,y,d)} \rho_2(\hat{c}(x',y',d') - \hat{c}(x,y,d)); \quad (13)$$

3) a prior distribution on the opacities:

$$C_3 = \sum_{(x,y,d)} \phi(\alpha(x,y,d)) \quad (14)$$

In the above equations, $\rho_1$ and $\rho_2$ are either quadratic functions or robust penalty functions, and $\phi$ is a function which encourages opacities to be 0 or 1, e.g., $$\phi(x) = x((1-x)) \quad (15)$$

To minimize the total cost function, $$C = \lambda_1 C_1 + \lambda_2 C_2 + \lambda_3 C_3, \quad (16)$$

we use a preconditioned gradient descent algorithm in one implementation of the refining stage. Other conventional techniques for minimizing a cost function can be used as well, and this particular technique is just one example.

Referring to FIG. 9, we now describe the gradient descent approach. FIG. 9 illustrates an implementation of adjusting color and opacity elements in the refining stage using a gradient descent approach. The refining stage computes the first element of the cost function from the error values, $e_k(u,v)$ (290), the accumulated color and opacity in each layer d, $a_k(u,v,d)$ (292), and the visibility in each d-layer, $V_k(u,v,d)$ (294). FIG. 8 illustrates how to compute these error values in more detail.

As illustrated in block 296, the refining stage computes the accumulated color and opacity values 292 for each d layer by multiplying the color and opacity values for each layer by the corresponding visibility for that layer. FIG. 7 and the accompanying description above provide more detail on how to compute the visibility for each layer.

Next as shown in block 298, the refining stage computes the gradient and Hessian using the error values, the accumulated colors and opacities, and the visibilities for each resampled layer, k. More specifically, the refining stage first computes the gradient and the diagonal of the Hessian for the cost $C_1$ with respect to the resampled colors in (u,v,d) space.

The derivative of $C_1$ can be computed by expressing the resampled colors and opacities in (u,v,d) space as follows:

$$\tilde{c}_k(u,v) = \quad (17)$$

$$\sum_{d'=d}^{d_{max}} \tilde{c}_k(u,v,d')V_k(u,v,d') + (1-\alpha_k(u,v,d))\tilde{a}_k(u,v,d-1)$$

$$\tilde{a}_k(u,v,d) = \sum_{d'=d_{min}}^{d} \tilde{c}_k(u,v,d')V_k(u,v,d')$$

$$\frac{\partial r_k(u,v)}{\partial r_k(u,v,d)} = \frac{\partial g_k(u,v)}{\partial g_k(u,v,d)} = \frac{\partial b_k(u,v)}{\partial b_k(u,v,d)} = V_k(u,v,d)$$

$$\frac{\partial \tilde{c}_k(u,v)}{\partial \alpha_k(u,v,d)} = [0\ 0\ 0\ V_k(u,v,d)]^T - \tilde{a}_k(u,v,d-1)$$

In the computation of $C_1$, the error values can be weighted by the position of the camera k relative to the virtual camera. However, assuming that the weights are 1, and $\rho_1(e_k) = \|e_k\|^2$, then the gradient and Hessian of $C_1$ in (u,v,d) space are:

$$\tilde{g}_k(u,v,d) = V_k(u,v,d)(e_k(u,v) - [0\ 0\ 0\ e_k(u,v) \cdot \tilde{a}_k(u,v,d-1)]^T)\ \tilde{h}_k(u,v,d) =$$
$$V_k(u,v,d)[1\ 1\ 1\ 1 - \|\tilde{a}_k(u,v,d-1)\|^2]^T \quad (18)$$

The gradient and Hessian are of $C_1$ in (u,v,d) space are illustrated as data representations 300 and 302 in FIG. 9.

Once the refining stage computes the derivatives with respect to the warped predicted (re-sampled estimates) color values, it then transforms these values into disparity space. This can be computed by using the transpose of the linear mapping induced by the backward warp used in step 224 of FIG. 6. For certain cases the result is the same as warping the gradient and Hessian using the forward warp $W_f$. For many other cases (moderate scaling or shear), the forward warp is still a good approximation. As such, we can represent the Warp operator 304 using the following expressions:

$$\hat{g}_1(x,y,d) = W_f(g_k(u,v,d);H_k + t_k[0,0,d])$$

$$\hat{h}_1(x,y,d) = W_f(h_k(u,v,d);H_k + t_k[0,0,d]) \quad (19)$$

The Warp operator transforms the gradient and Hessian of $C_1$ in (u,v,d) space to general disparity space. The gradient and Hessian in general disparity space $\tilde{g}_1, \tilde{h}_1$, are illustrated by data representations 306, 308 in FIG. 9.

We now refer to the top of FIG. 9, illustrating the cost function for the spatial difference. As shown in block 310, the refining stage computes the spatial difference from the current estimates of color and opacity 312, 314 as follows:

$$\hat{g}_2(x,v,d) = \sum_{(x',y',d') \in N_4(x,y,d)} \dot{\rho}_2(c(x',y',d') - c(x,y,d)) \quad (20)$$

where $\pi_2$ is applied to each color component separately. The Hessian is a constant for a quadratic penalty function. For non-quadratic functions, the secant approximation $\pi(r)/r$ can be used. The gradient and Hessian for the cost function $C_2$ are shown as data representations 316 and 318 in FIG. 9.

Finally, the derivative of the opacity penalty function can be computed for $\phi = x(1-x)$, as:

$$\tilde{g}_3(x,y,d) = [0\ 0\ 0\ (1-2\alpha(x,y,d))]^T. \quad (21)$$

To ensure that the Hessian is positive, we set $\tilde{h}_3(x,y,d) = [0\ 0\ 0\ 1]^T$. The computation of the opacity penalty function, shown in FIG. 9 as block 320, gives the gradient and Hessian $\tilde{g}_3$, $\tilde{h}_3$, for the cost function $C_3$ (shown as data representations 322, 324 in FIG. 9).

The next step is to combine the gradients for each of the cost functions as shown in step 326. The expressions for the combined gradients 328, 330 are as follows:

$$\hat{g}(x, y, d) = \lambda_1 \sum_{k=1}^{K} \hat{g}_1(x, y, d, k) + \lambda_2 \hat{g}_2(x, y, d) + \lambda_3 \hat{g}_3(x, y, d), \quad (22)$$

$$\hat{h}(x, y, d) = \lambda_1 \sum_{k=1}^{K} \hat{h}_1(x, y, d, k) + \lambda_2 \hat{h}_2(x, y, d) + \lambda_3 \hat{h}_3(x, y, d)$$

A gradient step can then be performed as follows:

$$\tilde{c}(x,y,d) \leftarrow \tilde{c}(x,y,d) + \epsilon_1 \tilde{g}(x,y,d)/(\tilde{h}(x,y,d) + \epsilon_2). \quad (23)$$

This step adjusts the estimated color and opacity values to produce adjusted color and opacity values. In a current implementation, we have set $\epsilon_1 = \epsilon_2 = 0.5$. In FIG. 9, the gradient step block 332 computes an adjustment value for the colors and opacities, $\Delta c(x,y,d) = \epsilon_1 \tilde{g}(x,y,d)/(\tilde{h}(x,y,d) + \epsilon_2)$ (334). The adjustment values are then combined with the previous estimates of color and opacity to compute the adjusted color and opacity estimates.

The adjusted color and opacities can then be used as input to the reprojection stage, which computes estimated images from the adjusted color and opacity values. The steps of:

1) adjusting the color and opacity estimates,
2) re-projecting the color, disparity and opacity estimates from disparity space to the input cameras, and
3) computing the error between the re-projected images and input images can be repeated a fixed number of times or until some defined constraint is satisfied such as reducing the error below a threshold or achieving some predefined level of continuity in the colors and/or opacities.

While we have described our stereo matching methods in the context of several specific implementations and optional features, it is important to note that our invention is not limited to these implementations. For example, we have illustrated one example of general disparity space, but the position and orientation of the virtual camera and disparity planes can vary depending on the application and the working volume of interest. We have described some optional techniques for disambiguating matches by aggregating evidence and some specific techniques for computing statistics for the local color distributions. However, it is not necessary to use these specific techniques to implement the invention. Other methods for aggregating evidence and performing statistical analyses can be used as well.

We explained a specific method for using visibility to improve color and disparity estimates. While this does improve the accuracy of estimating the depths and colors of visible surface elements, it is not required in all implementations of the invention. For example, it is possible to skip directly to refining initial color and opacity elements by computing the error values for the estimates and then adjusting the estimates based at least in part on the error between the estimated images and the input images.

We have described alternative methods for simultaneously computing color, disparity and opacity estimates from K input images, but we do not intend the specific implementations described above to be an exclusive list. The initial estimates of opacity do not have to be binary opacities, but instead, can be selected in a range from fully opaque to fully transparent based on, for example, the statistics (e.g., variances) or confidence values produced by aggregating evidence. Even assuming that the initial estimates are binary, these estimates can be refined using a variety of techniques such as passing the binary estimates through a low pass filter or using an iterative approach to reduce errors between re-projected images and the input images.

In view of the many possible embodiments to which the principles of our invention may be applied, it should be recognized that the illustrated embodiments are only specific examples illustrating how to implement the invention and should not be taken as a limitation on the scope of the invention. Rather, the scope of the invention is defined by the following claims. We therefore claim as our invention all that comes within the scope and spirit of these claims.

We claim:

1. A method for performing stereo matching comprising:

selecting a general disparity space representing a projective sampling of 3D space, where the projective sampling includes an array of cells in the 3D space;

transforming k input images into a group of cells of the general disparity space, where k is two or more and the input images are comprised of pixels each having color values, such that each cell in the group has a set of color samples, where each color sample in the set originates from a color value of a pixel of one of the input images that maps to the cell;

computing a color for each of the cells in the group based on the set of color samples for the cell;

computing for each of the cells in the group a probability that the cell represents a visible surface element of an object depicted in the input images based on the set of color samples for the cell; and estimating an opacity for each of the cells in the group based on the probability that the cell represents a visible surface element.

2. The method of claim 1 including aggregating evidence from neighboring cells in the general disparity space to compute confidence values for the cell indicating likelihood that the cell represents a visible surface element of the object depicted in the input images, and using the confidence values to estimate an opacity for the cell.

3. The method of claim 1 including:

using the estimated opacities to compute a visibility map indicating whether the cells are visible from an input camera corresponding to an input image; and using the visibility map to refine the computed colors.

4. The method of claim 1 including:

re-projecting the computed colors from general disparity space to input cameras for the input images to compute re-projected images; and computing error values between the re-projected images and the input images by comparing the color values in the re-projected images with color values in the input images at corresponding pixel locations.

5. The method of claim 4 wherein re-projecting includes:

transforming disparity planes in general disparity space to input cameras, where each of the disparity planes comprises an array of computed colors and estimated opacities; and compositing the transformed disparity planes into the re-projected images of the input cameras using the estimated opacities.

6. The method of claim 4 including:
adjusting the computed colors for the cells based at least in part on the error values to compute current color values.

7. The method of claim 6 including:
adjusting the estimated opacities for the cells based at least in part on the error values to compute current color values and opacity estimates.

8. The method of claim 6 including:
adjusting the computed colors and estimated opacities based at least in part on the error values and a smoothness constraint on the computed colors.

9. The method of claim 6 including:
re-projecting the current color values from general disparity space to input cameras to compute a new set of re-projected images;
computing new error values between the new set of re-projected images and the input images; and
adjusting the current color values based at least in part on the new error values.

10. The method of claim 7 including:
re-projecting the current color values and opacity estimates from general disparity space to input cameras to compute a new set of re-projected images;
computing new error values between the new set of re-projected images and the input images; and
adjusting the current color values and opacity estimates based at least in art on the new error values.

11. The method of claim 6 including adjusting the computed colors using a cost minimization function based at least in part on minimizing the error values.

12. The method of claim 7 including adjusting the computed colors and estimated opacities using a cost minimization function based at least in part on minimizing the error values.

13. The method of claim 10 wherein adjusting the computed colors includes using a gradient descent method.

14. The method of claim 13 wherein adjusting the computed colors and estimated opacities includes using a gradient descent method.

15. The method of claim 1 wherein the cells are located at (x,y,d) coordinates in the 3D space, and wherein (x,y) represents a rectangular coordinate on a disparity plane d, and d represents disparity.

16. The method of claim 1 including selecting a subset of cells that are likely to lie on a visible surface based on the probabilities.

17. The method of claim 16 wherein the probabilities are derived from the mean and variance of color samples at each cell in the group.

18. A computer readable medium having computer-executable instructions for performing the steps recited in claim 1.

19. The method of claim 1 wherein the color values, color samples, and computed colors are gray scale values.

20. A method for performing stereo matching comprising:
selecting a general disparity space representing a projective sampling of 3D space, where the projective sampling includes an array of cells in the 3D space;
transforming k input images from screen coordinates of corresponding input cameras to the general disparity space, where k is two or more and the input images are comprised of pixels each having color values;
from the color values that map from the input images to the cells in the general disparity space, computing probabilities that the cells represent visible surface elements of an object depicted in the input images;
computing initial estimates of color at the cells based on the probabilities;
computing initial estimates of disparities of the visible surface elements based on the probabilities;
computing initial estimates of opacities at the cells based on the probabilities;
using the opacities to compute visibility values for the cells indicating whether the cells are visible with respect to the input cameras; and
revising the initial color and disparity estimates based on the visibility values at the cells.

21. The method of claim 20 wherein the color values are gray scale values.

22. The method of claim 20 wherein the color values are color triplets.

23. The method of claim 20 wherein the probabilities are derived from mean and variance of k color value estimates at the cells in general disparity space.

24. The method of claim 23 wherein estimating the initial disparities includes comparing the variance of cells in an (x,y) column in the general disparity space to assess likelihood that one of the cells in the (x,y) column lies on a visible surface element.

25. The method of claim 20 including:
projecting the initial opacity estimates from the general disparity space to a (u,v,d) space of each of the input cameras;
computing visibilities at the (u,v,d) coordinates of each of the input cameras; and
transforming colors from the input images and the visibilities to the general disparity space such that updated colors in general disparity space have an associated visibility value; and
using the associated visibility values to weight statistics on the updated colors at the cells in the general disparity space.

26. A method for performing stereo matching comprising:
selecting a general disparity space representing a projective sampling of 3D space, where the projective sampling includes an array of cells at (x,y,d) coordinates in the 3D space, and d represents disparity planes comprised of (x,y) coordinates;
transforming k input images from screen coordinates of corresponding input cameras to the general disparity space, where k is two or more and the input images are comprised of pixels each having color values;
from the color values that map from the input images to the cells in the general disparity space, computing mean and variance of the color values at each cell;
computing initial estimates of color at the cells based on the mean at each cell;
computing initial estimates of disparities of visible surface elements based at least in part on the variance;
computing initial estimates of opacities at the cells based at least in part on the variance at each cell;
using the opacities to compute visibility values for the cells indicating whether the cells are visible with respect to the input cameras;
revising the initial color and disparity estimates based on the visibility values; and
refining estimates of color and opacity comprising:
a) transforming current estimates of color and opacity from general disparity space to the (u,v,d) coordinate space of each of the input cameras;

b) compositing the transformed, current estimates of color and opacity into re-projected images for each input camera;

c) comparing the re-projected images with the input images to compute error values for each of the input cameras;

d) adjusting the current estimates of color and opacity based on the error values; and e) repeating steps a–d to minimize the error values.

27. A method for performing stereo matching comprising:

selecting a general disparity space representing a projective sampling of 3D space, where the projective sampling includes an array of cells in the 3D space;

transforming k input images into the general disparity space, where k is two or more and the input images are comprised of pixels each having color values;

estimating colors for the cells in the general disparity space based on the color values of the pixels from the k input images that map to the cells in the general disparity space;

computing probabilities that the cells represent visible surface elements of an object depicted in the input images; and estimating opacities for the cells based on the probabilities, wherein the opacities are estimated by assigning totally opaque opacity values to cells that have a color variance below a threshold, and assigning totally transparent opacity values to cells that have a color variance above the threshold.

28. The method of claim 27 wherein the estimated opacities comprise binary opacities for (x,y) columns in the disparity space; and further including:

passing the binary opacities through a low pass filter to refine the opacity estimates.

29. The method of claim 27 wherein the estimated opacities comprise binary opacities for (x,y) columns in the disparity space; and further including:

refining the binary opacities by changing at least some of the binary opacities to non-binary opacities based on an intensity gradient of the estimated color values.

* * * * *

UNITED STATES PATENT AND TRADEMARK OFFICE
CERTIFICATE OF CORRECTION

PATENT NO. : 5,917,937
DATED : June 29, 1999
INVENTOR(S) : Szeliski et al.

It is certified that error appears in the above-identified patent and that said Letters Patent is hereby corrected as shown below:

| Col./Line | Error Reads | Should Read |
|---|---|---|
| 7/9 | andy axes | and y axes |
| 9/19 | $(1\alpha)$ | $(1-\alpha)$ |
| 9/19 | $a\beta c)(i+1,j+1()5)$ | $\alpha\,\beta c(i+1,j+1)\ (5)$ |
| 12/49 | $X_k = H_k X_o$ | $x_k = H_k x_o$ |
| 12/60 | $W_b(\tilde{c}(x,y,d)$ | $W_b(\hat{c}(x,y,d)$ |
| 12/61 | $\alpha_k(u,v,d)$ | $\tilde{\alpha}_k(u,v,d)$ |
| 12/61 | $W_b(\alpha(x,y,d)$ | $W_b(\hat{\alpha}(x,y,d)$ |
| 12/64 | $\alpha_k$ | $\tilde{\alpha}_k$ |
| 13/7 | $\alpha_k$ | $\tilde{\alpha}_k$ |
| 13/36 | $\alpha_k$ | $\tilde{\alpha}_k$ |
| 13/38 | $\alpha_k$ | $\tilde{\alpha}_k$ |
| 13/39 | $\alpha_k$ | $\tilde{\alpha}_k$ |
| 15/15 | $x((1-x)$ | $x(1-x)$ |
| 15/37 | $\lambda 2 C_2$ | $\lambda_2 C_2$ |
| 16/40 | $\tilde{h}_1(x,y,d)$ | $\hat{h}_1(x,y,d)$ |
| 16/44 | $\tilde{g}_1, \tilde{h}_1$ | $\hat{g}_1, \hat{h}_1$ |
| 16/51 | $\hat{g}_2(x,v,d)$ | $\hat{g}_2(x,y,d)$ |
| 16/55 | $\pi$ | $\dot{p}$ |

UNITED STATES PATENT AND TRADEMARK OFFICE
CERTIFICATE OF CORRECTION

PATENT NO. : 5,917,937  
DATED : June 29, 1999  
INVENTOR(S) : Szeliski et al.

Page 2 of 2

It is certified that error appears in the above-identified patent and that said Letters Patent is hereby corrected as shown below:

| | | |
|---|---|---|
| 16/64 | $\tilde{g}_3(x,y,d)$ | $\hat{g}_3(x,y,d)$ |
| 16/65 | $\tilde{h}_3(x,y,d)$ | $\hat{h}_3(x,y,d)$ |
| 17/1 | $\tilde{g}_3, \tilde{h}_3$ | $\hat{g}_3, \hat{h}_3$ |
| 17/18 | $\tilde{c}(x,y,d) \leftarrow \tilde{c}(x,y,d)$ | $\hat{c}(x,y,d) \leftarrow \hat{c}(x,y,d)$ |
| 17/18 | $\tilde{g}(x,y,d)$ | $\hat{g}(x,y,d)$ |
| 17/18 | $\tilde{h}(x,y,d)$ | $\hat{h}(x,y,d)$ |
| 17/23 | $\tilde{g}(x,y,d)$ | $\hat{g}(x,y,d)$ |
| 17/23 | $\tilde{h}(x,y,d)$ | $\hat{h}(x,y,d)$ |
| 19/29 | in art on | in part on |

Signed and Sealed this

First Day of May, 2001

Attest:

NICHOLAS P. GODICI

Attesting Officer  Acting Director of the United States Patent and Trademark Office